(12) United States Patent
Choi

(10) Patent No.: US 8,551,646 B2
(45) Date of Patent: Oct. 8, 2013

(54) SECONDARY BATTERY

(75) Inventor: Hyun-Jin Choi, Suwon-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 504 days.

(21) Appl. No.: 12/848,409

(22) Filed: Aug. 2, 2010

(65) Prior Publication Data

US 2011/0076533 A1  Mar. 31, 2011

(30) Foreign Application Priority Data

Sep. 28, 2009  (KR) .................. 10-2009-0091801

(51) Int. Cl.
*H01M 2/02* (2006.01)
*H01M 2/08* (2006.01)

(52) U.S. Cl.
USPC .......................... 429/178; 429/185

(58) Field of Classification Search
USPC .................. 429/94, 178, 185, 162–164, 177
See application file for complete search history.

(56) References Cited

U.S. PATENT DOCUMENTS

| | | | |
|---|---|---|---|
| 7,618,737 B2 * | 11/2009 | Lee | 429/66 |
| 7,803,480 B2 * | 9/2010 | Lee | 429/94 |
| 7,862,925 B2 * | 1/2011 | Kim | 429/94 |
| 8,283,064 B2 * | 10/2012 | Kim et al. | 429/94 |
| 2004/0161662 A1 * | 8/2004 | Kim et al. | 429/94 |
| 2006/0093898 A1 * | 5/2006 | Kwak et al. | 429/94 |
| 2006/0093902 A1 * | 5/2006 | Lee | 429/130 |
| 2006/0251962 A1 * | 11/2006 | Kim | 429/130 |
| 2008/0102354 A1 * | 5/2008 | Lee | 429/94 |
| 2008/0233474 A1 * | 9/2008 | Son et al. | 429/129 |

FOREIGN PATENT DOCUMENTS

| | | |
|---|---|---|
| JP | 2001-291969 A | 10/2001 |
| JP | 2003-257413 | 9/2003 |
| KR | 10-2007-0042031 A | 4/2007 |
| KR | 10-2009-0011995 A | 2/2009 |

OTHER PUBLICATIONS

Notice of Allowance dated May 31, 2011 of corresponding Korean Patent Application No. 10-2009-0091801—1 pg.

* cited by examiner

*Primary Examiner* — Carlos Barcena
(74) *Attorney, Agent, or Firm* — Knobbe, Martens, Olson & Bear LLP

(57) ABSTRACT

A secondary battery in which a fixing tape is attached to an electrode assembly, a positive electrode tab, a negative electrode tab, and a cap plate without use of an insulating case to prevent the electrode assembly from vibrating. The secondary battery includes an electrode assembly including a positive electrode plate to which a positive electrode tab is coupled, a negative electrode plate to which a negative electrode tab is coupled, and a separator interposed between the positive electrode plate and the negative electrode plate, a can having an opened part on one side to accommodate the electrode assembly, a cap assembly sealing the opened part of the can, and a fixing tape continuously attached from the electrode assembly to a bottom surface of the cap assembly while being attached to the positive electrode tab and the negative electrode tab.

20 Claims, 3 Drawing Sheets

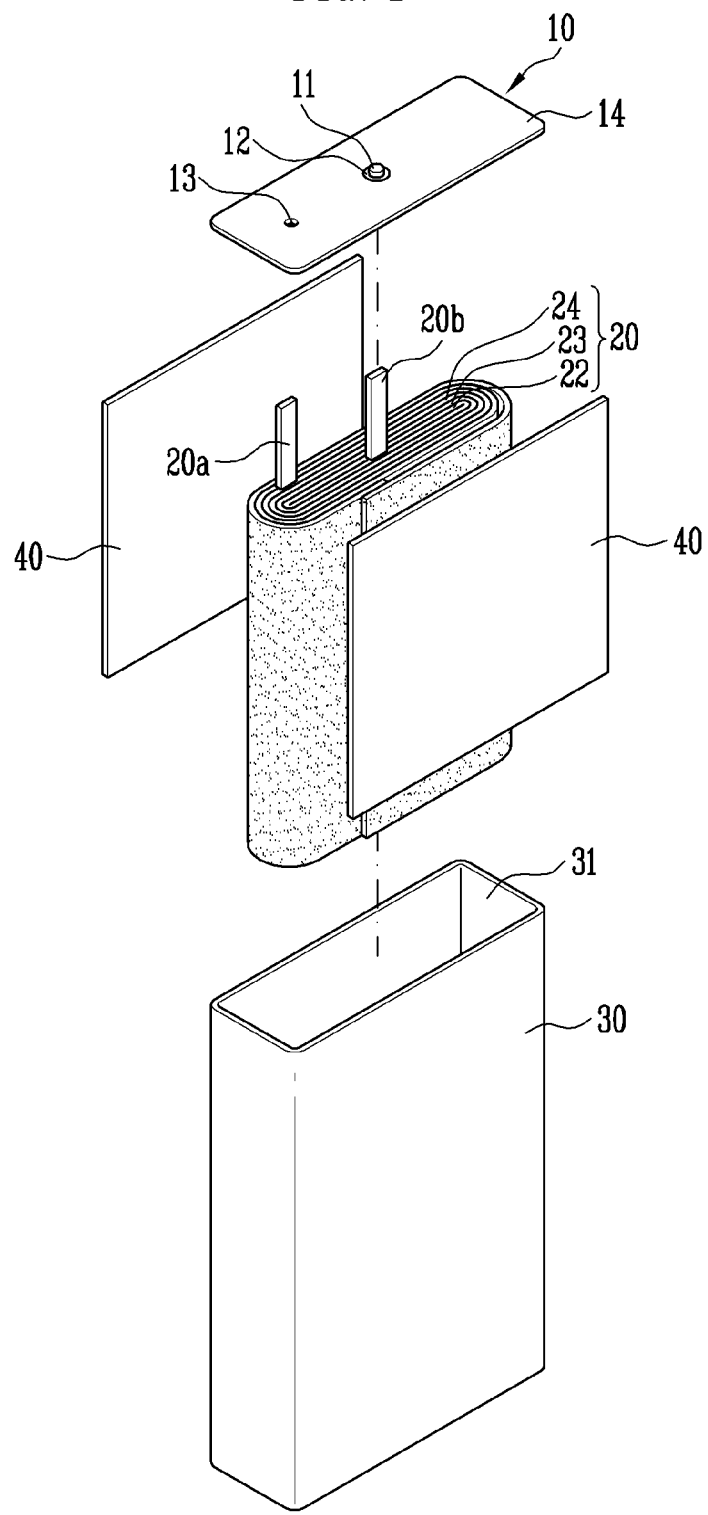

SECONDARY BATTERY

CROSS-REFERENCE TO RELATED APPLICATION

This application claims the benefit of Korean Patent Application No. 10-2009-0091801, filed Sep. 28, 2009 in the Korean Intellectual Property Office, the disclosure of which is incorporated herein by reference.

BACKGROUND

1. Field

Aspects of the present invention relate to a secondary battery, and more particularly, to a secondary battery capable of preventing an electrode assembly from vibrating without an insulating case.

2. Description of the Related Art

Recently, various batteries are used as the power sources of small electronic apparatuses. In particular, batteries such as lithium secondary batteries (which are small) and large capacity sealed type batteries are mainly used as the power sources of the small electronic apparatuses, such as mobile telephones, laptop computers, and camcorders, or other similar small electronic apparatuses.

A jelly-roll electrode assembly is obtained by coating a positive electrode collector and a negative electrode collector with an active material. A separator is interposed between the positive electrode collector and the negative electrode collector. The positive electrode collector and the negative electrode collector interposed with the separator are then wound. The jelly-roll electrode assembly is accommodated in a battery can, an electrolyte is injected into the battery can, and the battery can is sealed in order to form a lithium secondary battery. A cylindrical battery, in which an electrode assembly is accommodated in a cylindrical battery can, and a polygonal battery, in which an electrode assembly is accommodated in a square battery can, are commonly used.

Since the electrode assembly of the battery is wound around itself, a closing tape is attached onto the external surface of the electrode assembly in order to secure the electrode assembly in closing the electrode assembly. The electrode assembly onto which the closing tape is attached is accommodated in the can, the electrolyte is injected into the can, and the upper end of the can is sealed using a cap assembly.

At this time, the electrode assembly consists of a jelly-roll having a positive electrode plate, a negative electrode plate, a separator disposed between the positive electrode plate and the negative electrode plate and the closing tape attached onto the external surface of the jelly-roll. The jelly-roll is formed by laminating the positive electrode plate and the negative electrode plate to be coated with an active material and the separator interposed between the positive electrode plate and the negative electrode plate and by winding the laminated positive electrode plate, the negative electrode plate, and the separator about itself. The closing tape is attached so that it surrounds the external surface of the jelly-roll. The jelly-roll having the attached closing tape is compressed so as to form the electrode assembly.

Although the electrode assembly of the above secondary battery is inserted into the can, since the electrode assembly is not closely attached onto the internal surface of the can, when an external shock is applied to the secondary battery, the electrode assembly vibrates up and down or back and forth in the can. In particular, when the secondary battery is dropped, the electrode assembly vibrates up and down in the can such that the coupling part of the positive electrode tab or the negative electrode tab is separated or such that the electrode assembly is damaged which results in erroneous operation of the battery.

SUMMARY

Aspects of the present invention provide a secondary battery capable of preventing an electrode assembly from vibrating by attaching a fixing tape to the electrode assembly, a positive electrode tab, a negative electrode tab, and a cap plate without use of an insulating case in the secondary battery.

According to an aspect of the present invention, there is provided a secondary battery, including an electrode assembly including a positive electrode plate to which a positive electrode tab is coupled, a negative electrode plate to which a negative electrode tab is coupled, and a separator interposed between the positive electrode plate and the negative electrode plate, a can having an opened part on one side to accommodate the electrode assembly, a cap assembly sealing the opened part of the can, and a fixing tape continuously attached from the electrode assembly to a bottom surface of the cap assembly while being attached to the positive electrode tab and the negative electrode tab.

According to aspects of the present invention, the cap assembly includes a cap plate, an insulating plate, and a terminal plate formed on the bottom surface of the cap plate. The fixing tape is attached to the bottom surface of the cap plate.

According to aspects of the present invention, the electrode assembly includes a pair of long sides and a pair of short sides coupling both ends of the pair of long sides, respectively. The fixing tape is attached from the long sides of the electrode assembly that face each other to a bottom surface of the cap assembly while being attached to the positive electrode tab and the negative electrode tab.

According to aspects of the present invention, the fixing tape is attached by an area at least 30% of the size of the long side area of the electrode assembly.

According to aspects of the present invention, the fixing tape is extended to a lower end of the electrode assembly.

According to aspects of the present invention, the fixing tape is formed of a material that does not dissolve in an electrolyte injected into the can.

According to aspects of the present invention, the fixing tape is formed of polyimide (PI) or polyethylene terephtalate (PET).

According to aspects of the present invention, the thickness of the fixing tape is between 20 µm and 30 µm.

According to another aspect of the present invention, the fixing tape is attached to the electrode assembly, the positive electrode tab, the negative electrode tab, and the cap plate, without use of the insulating case, to prevent the electrode assembly from vibrating. Therefore, the height of the positive electrode plate and the negative electrode plate may be increased as much as the height of the insulating case so that the capacity of the battery may be improved and that the insulating case may not be used to save cost.

According to aspects of the present invention, the fixing tape may simultaneously function as the closing tape of the electrode assembly and the closing tape may be removed.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 is an exploded perspective view of a secondary battery according to an embodiment of the present invention;

DETAILED DESCRIPTION

Figure 2A:
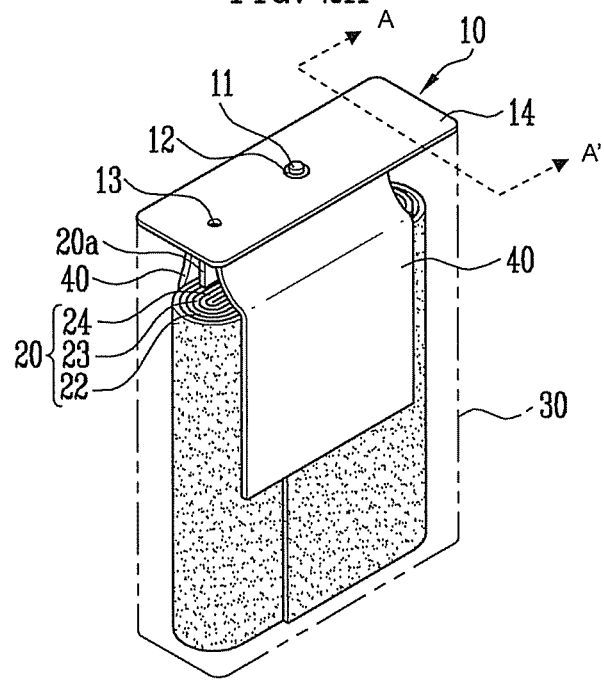
FIG. 2A is a perspective view illustrating a fixing tape according to the embodiment of the present invention illustrated in FIG. 1.

Reference will now be made in detail to the present embodiments of the present invention, examples of which are illustrated in the accompanying drawings, wherein like reference numerals refer to the like elements throughout. The embodiments are described below in order to explain the present invention by referring to the figures. In addition, when an element is referred to as being "on" another element, it can be directly on another element or be indirectly on another element with one or more intervening elements interposed therebetween. Also, when an element is referred to as being "connected to" another element, it can be directly connected to another element or be indirectly connected to another element with one or more intervening elements interposed therebetween.

According to aspects of the present invention, a jelly-roll type polygonal secondary battery that generates charge and discharge by the movement of lithium ions will be described. However, aspects of the present invention are not limited thereto and may be applied to various secondary batteries.

FIG. 1 is an exploded perspective view of a secondary battery according to an embodiment of the present invention. Referring to FIG. 1, the secondary battery includes an electrode assembly 20, a can 30, a cap assembly 10, and a fixing tape 40.

The electrode assembly 20 is obtained by laminating a positive electrode plate 24 to which a positive electrode tab 20a is coupled, laminating a negative electrode plate 22 to which a negative electrode tab 20b is coupled, interposing a separator 23 between the positive electrode plate 24 and the negative electrode plate 22, and winding the laminated positive electrode plate 24, negative electrode plate 22, and separator 23 around themselves. Here, the positive electrode plate 24 and the negative electrode plate 22 are commonly obtained by coating metals with active materials, by charging the metals, by drying the metals, and by pressing and cutting off the metals. However, aspects of the present invention are not limited thereto, and the positive electrode plate 24 and the negative electrode plate 22 can be obtained with different active materials and metals according to the kind of the secondary battery. A lithium-transition metal oxide is used as the active material of the positive electrode plate 24 and carbon and a carbon complex are used as the active material of the negative electrode plate 22. However, aspects of the present invention are not limited thereto and other suitable active materials may be used.

The electrode assembly 20 is accommodated in the can 30 having one side as an opened part 31. An electrolyte is injected into the can 30 through an electrolyte injecting hole 13. The electrolyte is formed of organic liquid containing salt so that the lithium ions move between the positive electrode plate 24 and the negative electrode plate 22. The electrolyte is formed of an organic solvent and lithium salt such as $LiPF_6$, $LiBF_4$, and $LiCIO_4$. However, aspects of the present invention are not limited thereto, and other organic solvents and lithium salts may be used.

The cap assembly 10 seals the opened part 31 of the can 30 once the electrode assembly 20 is in the can 30. The cap assembly 10 includes an electrode terminal 11, a terminal plate 16 (shown in FIG. 2B), and a cap plate 14. A safety vent (not shown) for releasing pressure generated by a chemical reaction in the can 30 and an electrolyte injecting hole 13 for injecting the electrolyte are formed in the cap plate 14. The cap plate 14 is coupled to the opened part 31 of the can 30 by a coupling mechanism, such as welding, so that the can 30 can be sealed. However, aspects of the present invention are not limited thereto and other coupling mechanisms may be used.

In order to prevent the electrode assembly 20 from vibrating in the can 30, the fixing tape 40 is continuously attached from the electrode assembly 20 to the bottom surface of the cap plate 14 of the cap assembly 10 while being also attached the positive electrode tab 20a and the negative electrode tab 20b which are disposed in an area between the electrode assembly 20 and the cap plate 14.

The fixing tape 40 is attached by an area at least 30% of the size of a long side area of the electrode assembly 20. When the fixing tape 40 is attached by an area less than 30% of the size of the long side area, an adhesive force is not strong and the fixing tape 40 is more easily detached. The fixing tape 40 allows for the closing tape, used for preventing the electrode assembly 20 from being unfastened, to be omitted.

In addition, considering that the thickness of a common closing tape is approximately 22 μm, the thickness of the fixing tape 40 is between 20 μm to 30 μm. When the thickness of the fixing tape 40 is less than 20 μm, the strength of the fixing tape 40 is small and the fixing tape 40 is more easily torn so as to be taken off from the electrode assembly. When the thickness of the fixing tape 40 is larger than 30 μm, the thickness of the fixing tape 40 is large and the fixing tape 40 may not be easily attached from the electrode assembly 20 to the bottom surface of the cap plate 14 while being attached to the positive electrode tab 20a and the negative electrode tab 20b.

In other words, the fixing tape 40 is continuously attached along the long sides of the electrode assembly 20 that face each other from the bottom surface of the cap plate 14 to the electrode assembly 20 while also being attached to the positive electrode tab 20a and the negative electrode tab 20b. According to another aspect of the present invention, the fixing tape 40 is formed to have two separate parts that face each other. In other words, the fixing tape 40 has a first fixing tape part 40 attached from the bottom surface of the cap plate 14 to one of the long sides of the electrode assembly 20 while being attached to the positive electrode tab 20a and a second fixing tape part 40 attached from the bottom surface of the cap plate 14 to an other of the long sides of the electrode assembly 20 while being attached to the negative electrode tab 20b. Therefore, it is possible to prevent the electrode assembly 20 from vibrating in the can 30.

The fixing tape 40 functions as the insulating case positioned between the electrode assembly 20 and the cap assembly 10 in order to prevent the electrode assembly 20 from vibrating and thus, replaces the insulating case. Therefore, the space for the battery increases corresponding to the thickness of an insulating case and the areas of the positive electrode plate 24 and the negative electrode plate 22 are increased corresponding to the increased space so that the capacity of the battery can be improved.

Here, since the secondary battery is manufactured so as to have the electrolyte injected in the can 30, the fixing tape 40 is formed of a material that does not dissolve in the electrolyte. The fixing tape 40 is made of polyimide (PI) or polyethylene terephthalate (PET). However, aspects of the present invention are not limited thereto and other material that does not dissolve in the electrolyte may be used.

Figure 2B:
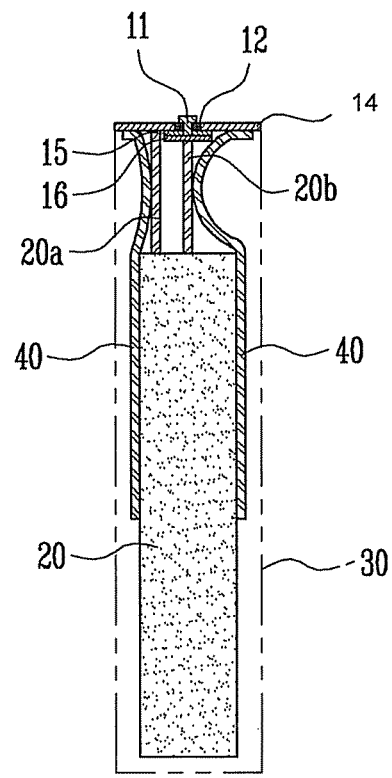
FIG. 2B is a side sectional view taken along the line A-A' of FIG. 2A.

FIG. 2A is a perspective view illustrating the fixing tape according to the embodiment of the present invention illustrated in FIG. 1. FIG. 2B is a side sectional view taken along the line A-A' of FIG. 2A.

Referring to FIGS. 2A and 2B, in the secondary battery, in order to prevent the electrode assembly 20 inserted into the can 30 from vibrating, the fixing tape 40 is continuously attached from the electrode assembly 20 to the bottom surface of the cap assembly 10 while being attached to the positive electrode tab 20a and the negative electrode tab 20b. More specifically, the fixing tape 40 is attached to the bottom surface of the cap plate 14 which is included in the cap assembly 10.

The electrode terminal 11 is formed on the cap plate 14. The electrode terminal 11 is coupled to the cap plate 14 and is insulated with an insulating plate 15 and a gasket 12. The electrode terminal 11 is physically coupled to the negative electrode tab 20b with the terminal plate 16 interposed between the electrode terminal 11 and the negative electrode tab 20b. In addition, the positive electrode tab 20a is coupled to the cap plate 14. The polarities of the positive electrode tab 20a and the negative electrode tab 20b, which are withdrawn from the positive electrode plate and the negative electrode plate, respectively, may change in accordance with the structure of the battery.

Figure 3:
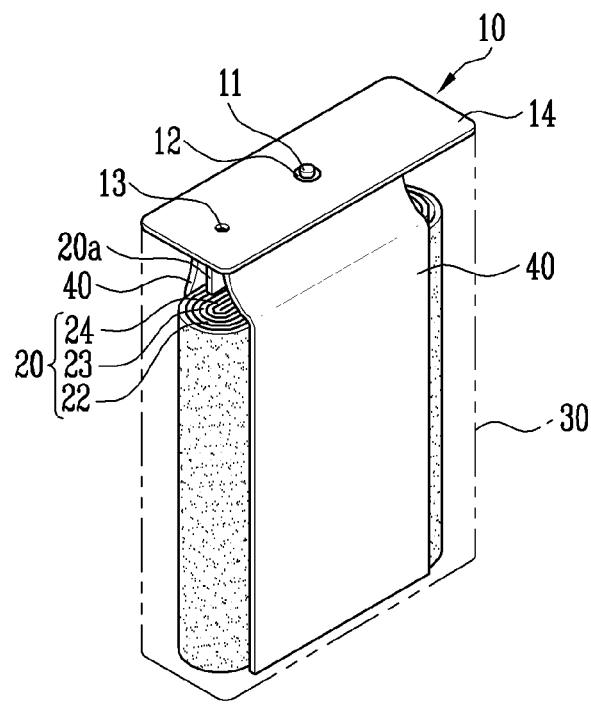
FIG. 3 is a perspective view illustrating a fixing tape according to another embodiment of the present invention.

FIG. 3 is a perspective view illustrating a fixing tape 40 according to another embodiment of the present invention. Referring to FIG. 3, a secondary battery includes an electrode assembly 20, a can 30, and a cap assembly 10. The electrode assembly 20 is obtained by laminating a positive electrode plate 24 to which a positive electrode tab 20a is coupled, laminating a negative electrode plate 22 to which a negative electrode tab 20b (shown in FIG. 2B) is coupled, and having a separator 23 interposed between the positive electrode plate 24 and the negative electrode plate 22. The positive electrode plate 24, the negative electrode plate 22, and the separator 23 are wound together to form the electrode assembly 20, which is inserted into the can 30. An opened part 31 of the can 30 is sealed by the cap assembly 10. The cap assembly 10 includes a cap plate 14 and a terminal plate 16 (shown in FIG. 2B) formed on a bottom surface of the cap plate 14.

The fixing tape 40 is attached from the electrode assembly 20 to the bottom surface of the cap plate 14 while being attached to the positive electrode tab 20a and the negative electrode tab 20b. Therefore, it is possible to prevent the electrode assembly 20 from vibrating in the can 30 of the secondary battery. In other words, the fixing tape 40 is attached from the long sides of the electrode assembly 20 that face each other to the bottom surface of the cap plate 14 while being attached to the positive electrode tab 20a and the negative electrode tab 20b.

Here, the fixing tape 40 is extended to the lower end of the electrode assembly 20. Therefore, when the electrode assembly 20 is inserted into the can 30 through the opening of the can 30, the electrode assembly 20 smoothly slides into the can 30, which is formed of metals such as aluminum, stainless steel, nickel, gilt, and soft steel. However, aspects of the present invention are not limited thereto and other similar metals or suitable materials for the can 30 may be used to form the can 30. Therefore, the fixing tape 40 allows the electrode assembly 20 to be more easily inserted into the can 30 and may prevent the electrode assembly 20 from being deformed by friction against the inside of the can 30. In addition, a closing tape used for preventing the electrode assembly 20 from being unfastened is not required to be used.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery, comprising:
   an electrode assembly comprising:
   a positive electrode plate to which a positive electrode tab is coupled;
   a negative electrode plate to which a negative electrode tab is coupled; and
   a separator interposed between the positive electrode plate and the negative electrode plate;
   a can having an opened part on one side to accommodate the electrode assembly;
   a cap assembly sealing the opened part of the can; and
   a fixing tape continuously attached from the electrode assembly to a bottom surface of the cap assembly while being attached to the positive electrode tab and the negative electrode tab.

2. The secondary battery as claimed in claim 1, wherein the cap assembly comprises:
   a cap plate;
   an insulating plate; and
   a terminal plate formed on the bottom surface of the cap plate,
   wherein the fixing tape is attached to the bottom surface of the cap plate.

3. The secondary battery as claimed in claim 1,
   wherein the electrode assembly comprises a pair of long sides and a pair short sides coupling both ends of the pair of long sides, respectively, and
   wherein the fixing tape is attached from the long sides of the electrode assembly that face each other to a bottom surface of the cap assembly while being attached to the positive electrode tab and the negative electrode tab.

4. The secondary battery as claimed in claim 3, wherein the fixing tape is attached by an area at least 30% of the size of the long side area of the electrode assembly.

5. The secondary battery as claimed in claim 1, wherein the fixing tape is extended to a lower end of the electrode assembly.

6. The secondary battery as claimed in claim 1, wherein the fixing tape is formed of a material that does not dissolve in an electrolyte injected into the can.

7. The secondary battery as claimed in claim 1, wherein the fixing tape is formed of polyimide (PI) or polyethylene terephtalate (PET).

8. The secondary battery as claimed in claim 1, wherein a thickness of the fixing tape is between 20 μm and 30 μm.

9. The secondary battery as claimed in claim 1, wherein the electrode assembly is a wound in a jelly-roll shape and the fixing tape is a closing tape preventing the electrode assembly from being unwound.

10. The secondary battery as claimed in claim 1, wherein the fixing tape is continuously attached from a bottom surface of the cap assembly to a bottom surface of the can and is attached along a side of the positive electrode tab, a side of the negative electrode tab, and both long sides of the electrode assembly.

11. A secondary battery, comprising:
    an electrode assembly comprising:

a positive electrode plate to which a positive electrode tab is coupled;

a negative electrode plate to which a negative electrode tab is coupled; and a separator interposed between the positive electrode plate and the negative electrode plate;

a can having an opened part on one side to accommodate the electrode assembly;

a cap assembly sealing the opened part of the can;

a first fixing tape connecting the electrode assembly, one of the positive and negative electrode tabs, and the cap assembly.

12. The secondary battery as claimed in claim 11, further comprising a second fixing tape connecting the electrode assembly, the cap assembly, and the other of the positive and negative electrode tabs that is not connected to the first fixing tape.

13. The secondary battery as claimed in claim 12, wherein the first fixing tape is attached to the cap assembly, the positive electrode tab, and a first side the electrode assembly, and the second fixing tape is attached to the cap assembly, the negative electrode tab and a second side of the electrode assembly opposite the first side of the electrode assembly.

14. The secondary battery as claimed in claim 13, wherein the electrode assembly comprises:
    a first long side;
    a second long side disposed opposite the first long side;
    a first short side; and
    a second short side disposed opposite the first short side,
        wherein the first short side and the second short side couple both ends of the first long side and the second long side, respectively, and wherein the first fixing tape is attached from the first long side of the electrode assembly to a bottom surface of the cap assembly while being attached to the positive electrode, and wherein the second fixing tape is attached from the second long side of the electrode assembly to the bottom surface of the cap assembly while being attached to the negative electrode.

15. The secondary battery as claimed in claim 14, wherein the first tape and the second fixing tape are attached by an area at least 30% of the size of the first long side area of the electrode assembly and the second long side area of the electrode assembly, respectively.

16. The secondary battery as claimed in claim 13, wherein the first fixing tape and the second fixing tape are extended to a lower end of the electrode assembly.

17. The secondary battery as claimed in claim 13, wherein the first fixing tape and the second fixing tape are formed of a material that does not dissolve in an electrolyte injected into the can.

18. The secondary battery as claimed in claim 13, wherein the first fixing tape and the second fixing tape are formed of polyimide (PI) or polyethylene terephtalate (PET).

19. The secondary battery as claimed in claim 13, wherein thicknesses of the first fixing tape and the second fixing tape are between 20 µm and 30 µm.

20. The secondary battery as claimed in claim 12, wherein the cap assembly comprises:
    a cap plate;
    an insulating plate; and
    a terminal plate formed on the bottom surface of the cap plate,
        wherein the first fixing tape and the second fixing tape are attached to a bottom surface of the cap plate.

* * * * *

UNITED STATES PATENT AND TRADEMARK OFFICE
CERTIFICATE OF CORRECTION

| | | |
|---|---|---|
| PATENT NO. | : 8,551,646 B2 | Page 1 of 1 |
| APPLICATION NO. | : 12/848409 | |
| DATED | : October 8, 2013 | |
| INVENTOR(S) | : Hyun-Jin Choi | |

It is certified that error appears in the above-identified patent and that said Letters Patent is hereby corrected as shown below:

In the Specification

Col. 2, line 44, change "terephtalate" to --terephthalate--.

In the Claims

Col. 6, line 53, Claim 7, change "terephtalate" to --terephthalate--.

Col. 8, line 22, Claim 18, change "terephtalate" to --terephthalate--.

Signed and Sealed this
Twenty-fourth Day of June, 2014

Michelle K. Lee
*Deputy Director of the United States Patent and Trademark Office*